United States Patent [19]
LeMaster et al.

[11] Patent Number: 5,326,934
[45] Date of Patent: Jul. 5, 1994

[54] MULTI-COMMODITY CONNECTIVITY SYSTEM

[75] Inventors: Dolan M. LeMaster, Mesa; Gary H. Beals, Scottsdale, both of Ariz.

[73] Assignee: Communication Integrators Inc., Tempe, Ariz.

[21] Appl. No.: 726,953

[22] Filed: Jul. 8, 1991

[51] Int. Cl.[5] .......................... H02G 3/60; H02B 1/20
[52] U.S. Cl. ........................................ 174/59; 174/48; 361/827; 361/644
[58] Field of Search ...................... 174/59, 60, 48, 49; 361/428, 429, 390, 391, 346, 332, 334, 356, 357, 827, 728, 600, 601, 641-648; 439/209, 215

[56] References Cited

U.S. PATENT DOCUMENTS

| | | | |
|---|---|---|---|
| 2,078,991 | 5/1937 | Baker | 174/60 |
| 2,756,369 | 7/1956 | Gorrie | 361/428 X |
| 4,145,853 | 3/1979 | Bridwell | 361/827 X |
| 4,370,008 | 1/1983 | Haworth et al. | 439/215 X |
| 4,517,623 | 5/1985 | Barner et al. | 361/356 X |
| 4,559,410 | 12/1985 | Hostetter | 174/48 |
| 4,712,232 | 12/1987 | Rodgers | 174/60 X |
| 5,023,404 | 6/1991 | Hudson et al. | 361/428 X |
| 5,149,277 | 9/1992 | Le Master | 439/215 |

Primary Examiner—Timothy V. Eley
Assistant Examiner—Khan V. Nguyen
Attorney, Agent, or Firm—Lowell W. Gresham; Jordan M. Meschkow; Don J. Flickinger

[57] ABSTRACT

A system which manages the wiring and cabling needed by individual workstations (12) within an environment (10) having numerous workstations (12) is disclosed. Collective connectivity is utilized to couple a multi-commodity expansion cabinet, MCEC, (14) to building services (26, 28). The MCEC (14) transforms the collective connectivity into individual connectivity. Workstations (12) are grouped together into workstation clusters (30). A single MCEC (14) is assigned to each cluster (30). Individual connectivity is utilized to couple the MCEC (14) to the workstations (12) in the MCECs (14) cluster (30). The MCEC (14) is configured for use in and around high traffic areas in a building. The MCEC (14) is dimensioned for minimal size and compatibility with modern building practices. Individual raceways (68, 70) are provided for routing communication and power wiring. Various equipment bays (88, 94) are provided between the raceways (68, 70). The equipment bays are configured so that running room for cables (122, 130, 132) and power whips (32) exists within the interior of the MCEC (14).

12 Claims, 4 Drawing Sheets

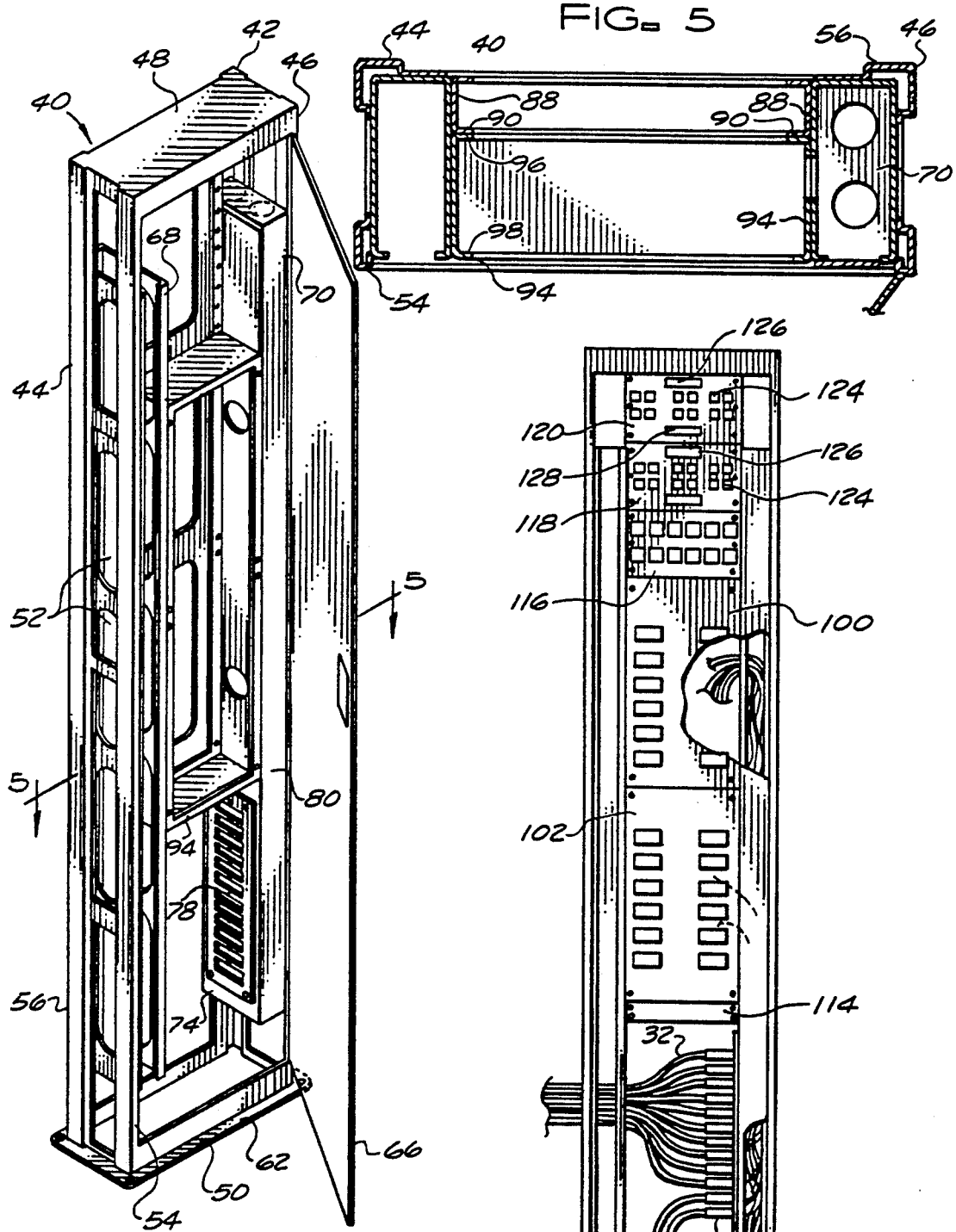

MULTI-COMMODITY CONNECTIVITY SYSTEM

RELATED APPLICATIONS

This invention is related to "Connectivity Management System", by Dolan M. LeMaster, filed Jan. 17, 1990, Ser. No. 07/466,249, which is incorporated herein by reference.

TECHNICAL FIELD OF THE INVENTION

The present invention relates generally to electrical power and communication connections and wiring within buildings. More specifically, the present invention relates to improved apparatuses and methods for satisfying the diverse wiring needs of individual workstations in an environment that has a multiplicity of workstations.

BACKGROUND OF THE INVENTION

The modern office requires a wide assortment of connectivity or wiring circuits for individual employee work areas, called workstations herein. AC electrical power, telephone voice communication, low speed data communication between computer terminals and central computers, and high speed local area network (LAN) data communication represent a few of the most common connectivity needs of employee work areas. In addition, many work areas use multiple voice circuits to support multiple phone lines, facsimile machines, modems, and the like. Often, multiple data lines communicate computer data to printers, plotters, remote input devices, and the like. Increasingly, work areas access fiber optic, broadband LAN, and video communication links.

Conventionally, the management of all these connectivity needs has been performed in an extremely makeshift, haphazard, and inefficient manner. As a result, work area connectivity has become extremely expensive, for both original wiring installation and later-occurring changes. For example, buildings often use independent systems to distribute power, voice, data, LAN, and video. This leads to a costly duplication in materials and labor. In addition, it leads to a costly lack of organization in overall building connectivity.

In addition, buildings often utilize connectivity systems which rely heavily upon on-site, hard-wired connections. Hard-wired connections require each end of a wire to be prepared. Such preparations typically involve removing insulation, dressing wire ends, identifying individual wires, applying terminators, attaching wires, applying strain reliefs, and the like. The attaching of a wire may be to another wire, a connection block, terminal, or the like. Accordingly, such hard-wired connections must be patiently and painstakingly performed by highly skilled, and expensive, personnel. Moreover, after wiring preparations, such highly skilled personnel must test and occasionally trouble-shoot a network of such wires. As a result, costs associated with the installation of conventional connectivity systems often reach astronomical proportions.

The physical environment of the modern office also changes at an increasing pace. These changes in the physical environment impose frequent changes in work area connectivity. However, conventional connectivity systems are extremely inflexible. Hard-wired connections again require the services of highly skilled personnel to make necessary changes. Often times such personnel are not available when needed, and entire schedules suffer as a result. When buildings employ separate connectivity systems for power, voice communication, data communication, LAN communication, video communication, and the like, the overall connectivity structure becomes extremely unorganized. False floors, ceilings, and wiring raceways, often resemble a "rat's nest" of cabling. Accordingly, minor connectivity changes often turn into extremely complicated and time consuming procedures due to this disorganization. Often, connectivity system changes are more efficiently implemented by entirely scrapping a prior system and installing an entirely new connectivity system when only moderate changes are imposed in a physical environment.

The prior art describes a few devices which address connectivity problems in the modern office. However, most of such devices address minor portions of the overall problem, and therefore fail to significantly reduce connectivity costs or to increase connectivity flexibility. For example, various manufacturers supply breakout boxes, connectors, raceways, ducts, and the like which serve as modular components that a designer may couple together to implement a connectivity system. However, such modular components fail to address the integration of various connectivity systems and the overall end-to-end connectivity problem. The use of such components provides little help in significantly reducing installation costs or in improving flexibility.

The above-referenced patent discloses a system which makes significant improvements in the conventional haphazard techniques utilized in providing connectivity. Still, this system relies upon undesirably numerous hard-wired connections in conveying electrical power from a building's power distribution center to individual workstations. Likewise, the system disclosed therein relies upon undesirably long runs of individual cabling for both electrical power and various types of communication. Generally speaking, individual cabling costs more and is more difficult to install and revise than collective cabling which conveys the same capacity. Thus, a need exists for a system which supports increased use of collective cabling and less use of individual cabling.

SUMMARY OF THE INVENTION

Accordingly, it is an advantage of the present invention that an improved system for providing integrated connectivity to a multiplicity of workstations is provided.

Another advantage of the present invention is that a multi-commodity connectivity expansion cabinet is provided for transforming individual cabling into collective cabling.

Another advantage is that the present invention provides a multi-commodity connectivity expansion cabinet that achieves ease-of-access advantages normally associated with open-frame equipment racks and aesthetic and security advantages normally associated with closed-frame equipment racks.

Another advantage is that the present invention provides a multi-commodity connectivity expansion cabinet that easily adapts to a wide variety of modern building practices.

Another advantage is that the present invention provides a multi-commodity connectivity expansion cabinet that permits improved isolation of electrical power conveyed to individual workstations in an environment having many workstations.

Yet another advantage is that the present invention provides an apparatus and method which reduce material, installation, and revision costs of workstation connectivity.

The present invention is described herein using various terms and phrases that are related to the subject matter dealt with by the present invention. TABLE I, presented below, provides a glossary of some of these terms and phrases. For the purposes of the present invention, the normal usage of these terms and phrases is to be augmented by the definitions listed in TABLE I.

TABLE I

Collective Connectivity—connectivity (see below) which conveys a multiplicity of circuits of a single commodity. The number of circuits conveyed is greater than the needs of a single workstation. Hence, the commodity needs for more than one workstation are collectively conveyed by collective connectivity.

Commodity—any form of an electrical, optical, magnetic, or electromagnetic conveyance which can be used at a workstation. In modern workplaces, one commodity is electrical power and another commodity is information. Both of these commodities must be conveyed from a collective source of the commodity, such as a power distribution center, PBX, or local area network. The information commodity takes numerous forms, such as voice, low speed data, and high speed data. The diverse commodities are conveyed independently. In other words wires which convey electrical power typically do not also convey voice communication. Likewise, wires that convey voice communication typically do not convey high speed data communication. Moreover, multiple circuits or channels of power, voice, and data commodities are often required at a workstation so that multiple independent conveyances of these commodities can take place simultaneously.

Connectivity—the coupling of an individual need to a collective source. In an office or other workplace, connectivity refers to the wires, connectors, cables, channels, multiplexers, demultiplexers, and other devices, such as trays, raceways, and the like, used to convey a commodity (see above) between discrete individual workstations and collective sources of the commodity. The concept of connectivity encompasses the physical routing and grouping of vast numbers of wires and the multiplexing or combining of multiple circuits or channels on common wires in addition to the electrical connections achieved by wires and connectors.

Connectorizing—attaching a connector to a cable. A connectorized cable is distinguishable from a hardwired cable. Connectorization, when possible, is advantageous because connectorized cables are installed through the relatively simple task of running cables and plugging connectors into appropriate mating connectors. Numerous wires included in a single cable are dealt with as a unit in a connectorized cable. Installation and revision of hard-wired cables is a more complex task. For each wire in a cable, ends of hard-wired cables must be prepared and attached to appropriate termination points using appropriate attachment techniques.

Individual Connectivity—connectivity (see above) which conveys no more than a few circuits of one or more commodities (see above). The number of circuits conveyed are limited to the number which is needed by a single workstation.

The above and other advantages of the present invention are carried out in one form by an improved multi-commodity connectivity expansion cabinet. The cabinet comprises an elongated communication raceway. An elongated power raceway extends substantially parallel to, but spaced apart from, the communication raceway. A first frame extends between the communication and power raceways to define a communication break-out bay. A second frame extends between the communication and power raceways to define a power break-out bay.

The above and other advantages of the present invention are carried out in another form by an improved method of providing multi-commodity connectivity. The multi-commodity connectivity is provided for a multiplicity of workstations located in a building having a common power distribution center and a common communication distribution center. The method groups the workstations into workstation clusters. For each cluster, the method calls for providing individual power connectivity and individual communication connectivity between each workstation in the cluster and a single multi-commodity expansion cabinet which manages connectivity for said cluster. Collective connectivity is furnished between the multi-commodity expansion cabinet and the power distribution center. Collective connectivity is also supplied between the multi-commodity expansion cabinet and the communication distribution center.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 4 shows a perspective view of an empty MCEC constructed in accordance with the teaching of the present invention;

FIG. 5 shows a top-down cross sectional view of the MCEC shown in FIG. 4;

FIG. 6 shows a front view of a preferred MCEC with various break-out panels installed therein;

DETAILED DESCRIPTION OF THE PREFERRED EMBODIMENT

Figure 1:
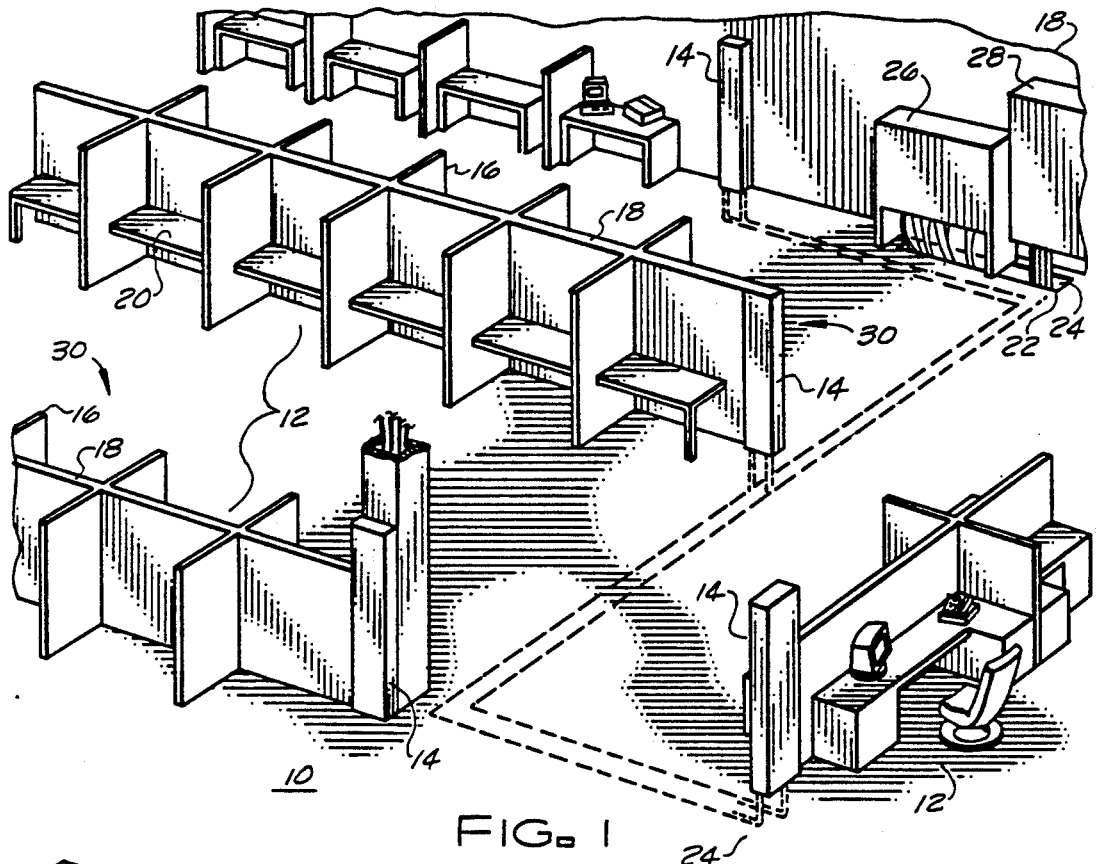
FIG. 1 shows a building interior in which a multiplicity of workstations are located and which utilizes a multi-commodity expansion cabinet (MCEC) in accordance with the teaching of the present invention.

FIG. 1 shows a building interior 10 in which a multiplicity of workstations 12 are located and in which a few multi-commodity expansion cabinets (MCECs) 14 are located. Interior 10 may represent a single floor of a multi-story building. Workstations 12 represent areas or positions at which employees or other individuals conduct their activities. Typically, workstations 12 are separated from each other by partition walls 16, which may be permanent features of building interior 10 or movable modular structures. Often, workstations 12 share a common permanent or temporary spine wall 18. Each of workstations 12 typically includes a work surface 20, which may be a modular or conventional table, bench, desk, counter, or the like. As is conventional, work surfaces 20 are spaced between a ceiling (not shown) and a floor 22 of building interior 10. Plenums 24, through which cabling may be routed, reside above the ceiling (not shown) or below floor 22 (or both). In addition, plenums 24 may connect stories together in a multistory building.

As is conventional, any of workstations 12 may include numerous forms of equipment, such as one or more computers, phones, motorized equipment, lights, recording equipment, radios, ovens, microwave ovens, refrigerators, coffee makers, clocks, typewriters, calculators, copy machines, facsimile machines, fans, heaters, and other types of equipment. This equipment has commodity (see TABLE I) needs which are met by supplying various commodities to each workstation 12. In other words, electrical power is a commodity that is conveyed to each workstation 12. In addition, information commodities, such as phone or voice communication, low speed data communication, and high speed data communication are conveyed to each workstation 12. Moreover, each workstation 12 preferably receives multiple circuits of each commodity. Thus, multiple electrical power consuming devices can operate independently from each other through the use of independent electrical power circuits. Likewise, multiple simultaneous voice and data communication sessions can take place over independent communication circuits. For example, a phone and facsimile machine may be simultaneously active at the same time a computer sends data to a remote printer and accesses a remote file server.

MCECs 14 aid in the management of the numerous wires that are needed to provide connectivity for all commodities conveyed within interior 10. Generally speaking, individual connectivity extends between MCECs 14 and workstations 12 while collective connectivity extends between MCECs 14 and a building signal closet or communication distribution center 26, a power distribution center 28, and the like. From centers 26 and 28, connectivity may be provided vertically, as discussed in the above-listed related patent. As discussed above, significant material, installation, and revision cost advantages result from maximizing collective connectivity while minimizing individual connectivity. It is MCECs 14 which, in an integrated fashion, transform individual connectivity into collective connectivity. Moreover, this transformation occurs as near to workstations 12 as possible.

In accordance with the present invention, workstations 12 are grouped together into clusters 30. Preferably, less than eighteen workstations 12 are included in any single cluster 30, and more preferably around twelve workstations are included in a single cluster 30. One convenient grouping associates all workstations 12 sharing a common spine wall 18 in a single cluster 30. Thus individual connectivity wiring may be routed through spine wall 18 to individual ones of workstations 12. However, any other convenient grouping of workstations 12 may be utilized so long as all workstations 12 included in a cluster 30 reside near one another to minimize and ease the installation of individual connectivity between each workstation 12 and its associated MCEC 14.

Generally speaking, MCECs 14 reside at convenient locations in interior 10 which are near their associated clusters 30. Hence, MCECs 14 typically reside out in the open and are not located in a closet as is conventional for communication distribution center 26 and power distribution center 28. As will be discussed in more detail below, MCEC 14 is dimensioned and otherwise configured for use in and near areas where considerable human traffic may be expected.

The collective connectivity that extends between MCECs 14 and centers 26 and 28 is preferably routed in any convenient fashion through ceiling or floor plenums 24.

Figure 2:
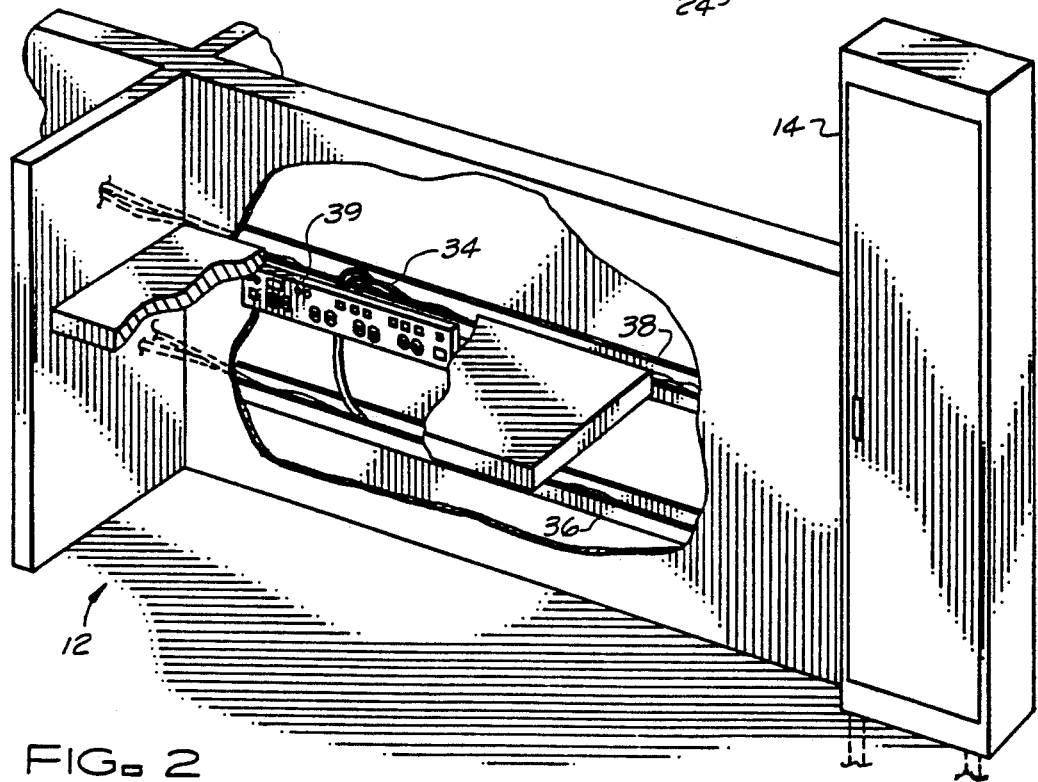
FIG. 2 illustrates connectivity between a single workstation and an MCEC in accordance with the teaching of the present invention.

FIG. 2 illustrates connectivity between a single workstation 12 and its associated MCEC 14. The connectivity illustrated in FIG. 2 is duplicated for all workstations 12 within the cluster 30 (see FIG. 1) which an MCEC 14 serves. As illustrated in FIG. 2, individual cables supply connectivity for individual workstations 12. In other words, twelve power whips 32 route power circuits from MCEC 14 to twelve different workstations 12. Preferably, power whips enclose wiring within a flexible conduit to meet safety and building code requirements. Likewise, twelve communication cable bundles 34 route voice, data, and LAN communication circuits from MCEC 14 to twelve different workstations 12. Preferably, power whips 32 reside in a tray 36 which is spaced apart within spine wall 18 from a tray 38 that holds cable bundles 34. Accordingly, one power whip 32 and one cable bundle 34 is provided for each workstation 12 within the cluster 30 (see FIG. 1). Communication cable bundles 34 are discussed in more detail in the above-listed related patent. On the other hand, as an alternative embodiment, separate voice, data, and LAN cables may provide the individual communication connectivity between each workstation 12 and MCEC 14. In that situation, three separate communication cables are required for each workstation 12.

Each of workstations 12 includes a unitized destination terminal 39, or its equivalent, as discussed in the above-listed related patent. Terminal 39 integrates and terminates all connectivity needs for a workstation 12. Preferably, cabling which extends down spine wall 18 is connectorized (see TABLE I) on both ends of the cabling so that it may be quickly and easily coupled to terminal 39 and MCEC 14 during installation in interior 10 (see FIG. 1). Moreover, such cables used in providing individual connectivity may be selected from standard length cables. Such standard length cables may be constructed and connectorized at an off-site factory, then transported to and installed in interior 10 (see FIG. 1). Non-skilled labor may be utilized in constructing such standard, connectorized cables, and economies of scale can be achieved by making vast quantities of such cables in standard lengths.

Figure 3:
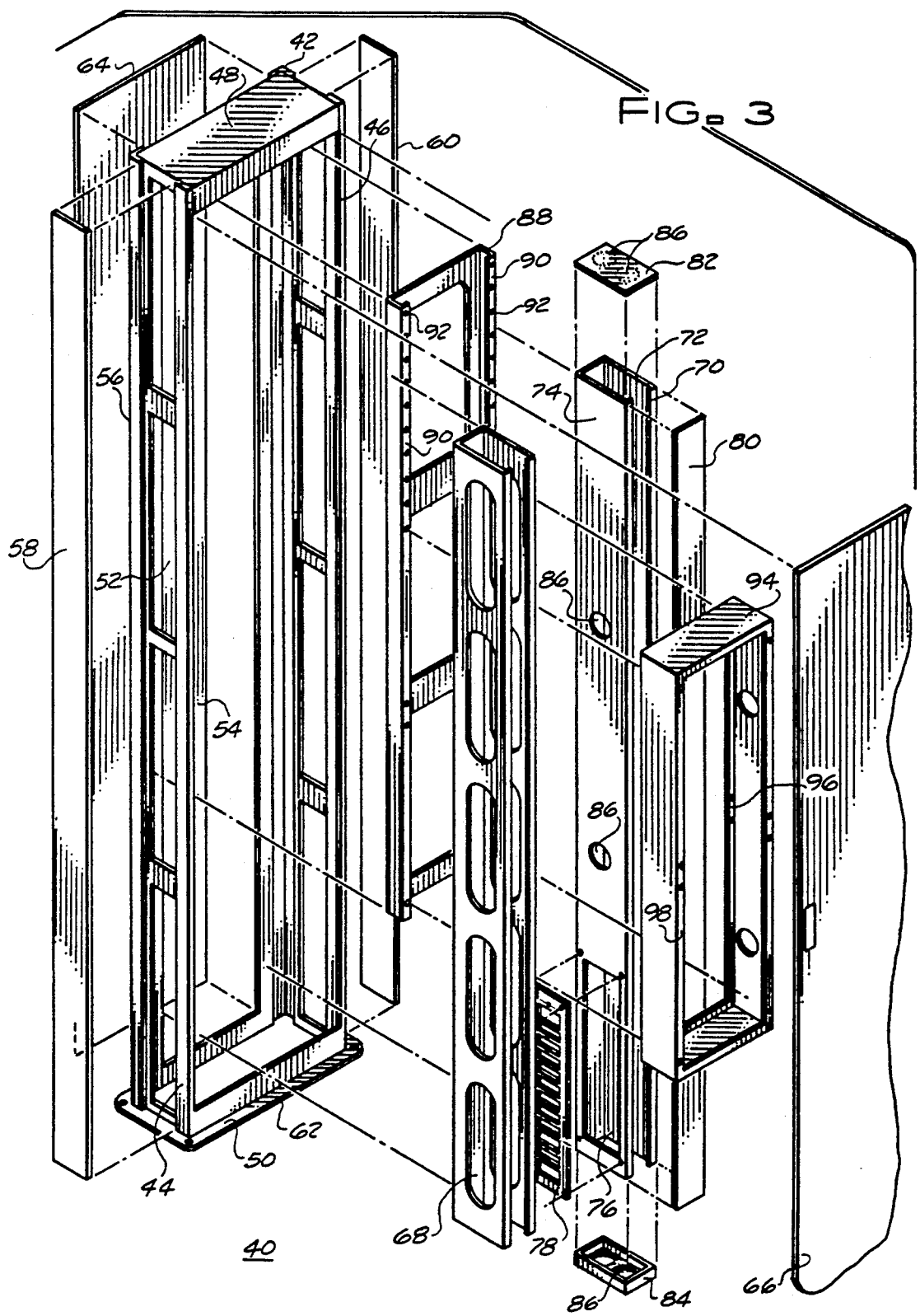
FIG. 3 shows an exploded view of a preferred MCEC constructed in accordance with the teaching of the present invention.

FIGS. 3-5 show an empty MCEC 14. In other words, FIGS. 3-5 show only a cabinet 40 within which individual connectivity is transformed into collective connectivity, and FIGS. 3-5 omit all break-out panels, equipment, and cabling that actually accomplish the transformation. FIG. 3 shows an exploded view, FIG. 4 shows a perspective view, and FIG. 5 shows a down-looking cross sectional view taken at line 5—5 of FIG. 4.

As discussed above, cabinet 40 is configured for use in and near areas where considerable human traffic may be expected. In addition, cabinet 40 is configured for integration within modern office space building practices. Thus, cabinet 40 is configured to minimize any danger to nearby human traffic, to be secure from unwanted human meddling, to blend with conventional office fixtures, to adapt to numerous interior designs, and to be aesthetically pleasing in appearance.

With reference to FIGS. 3-5, cabinet 40 includes a framework 42 which consists of a left side member 44, a right side member 46, a top 48, and a bottom 50. Side members 44, 46 are each elongated, substantially straight, skeletal frames with a significant amount of open space 52 therethrough. In the preferred embodiment, members 44, 46 are around 64 inches long, but can be adjusted to any length greater than around 52 inches to permit cabinet 40 to adapt to any given interior design.

Open space 52 resides in the central region of side members 44-46. Side members 44-46 have solid portions proximate a front edge 54 and a back edge 56 thereof. Open space 52 is useful in manipulating cabling, particularly for communication connectivity, which is routed though raceways, as discussed below. In addition, such cabling may exit cabinet 40 through open space 52 when a side of MCEC 14 abuts spine wall 18 (see FIG. 2).

The central regions of side members 44, 46 are indented toward the interior of cabinet 40, as best shown in FIG. 5. This indentation is dimensioned to accommodate solid left and right side panels 58 and 60. Side panels 58, 60 attach to side members 44, 46, respectively, using any suitable fastening technique to cover open space 52. Once side panels 58, 60 are installed, the sides of cabinet 40 are substantially planar. Preferably, finishes applied to the exterior of side panels 58, 60 vary to accommodate aesthetic demands of the decor within which cabinet 40 is used.

Top and bottom 48 and 50 attach to side members 44 and 46 to cause framework 42 to exhibit a generally rectangular shape. Although FIGS. 3-4 illustrate top and bottom 48 and 50 as being substantially solid members, those skilled in the art will recognize that holes may be located therein as necessary to accommodate collective or individual connectivity, as suggested by FIG. 1. Bottom 50 may advantageously incorporate a floor anchoring and leveling plate 62. In the preferred embodiment, each of side members 44, 46, top 48, and bottom 50 are dimensioned to achieve a depth of between 4½ and 5½ inches, and more preferably around 5 inches, between front and back edges 54 and 56. Thus, framework 42 and cabinet 40 exhibit this depth of around 5 inches. Preferably, framework 42 is around 12 inches wide.

The 5 inch depth of cabinet 40 helps cabinet 40 adapt to modern building practices. Specifically, spine walls 18 (see FIG. 1) and other building walls are conventionally constructed from an interior framing member and wall boards (not shown) on opposing sides of the framing member to have a width of around 5 inches. Typical spine walls are around 64 inches high. As mentioned above, the height of cabinet 40 can be extended from a minimum height of around 52 inches to match the height of spine wall 18. Consequently, cabinet 40 may be installed at an end of a spine wall 18, as shown in FIGS. 1-2, and the depth of cabinet 40 causes cabinet 40 to match the width of the spine wall 18 and become a part of it. In addition, the small 5 inch depth allows MCEC 14 to be installed on walls, columns, bookcases, and the like (see FIG. 1) without sticking far out into the room. Thus, a minimum burden is imposed on nearby human traffic. Furthermore, this small 5 inch depth permits MCEC 14 to be installed under raised floors and in lowered ceilings in some applications (not shown).

Side members 44 and 46 provide finished corners for cabinet 40 at front and back edges 54 and 56. At back edge 56, side members 44 and 46 each extend a short distance toward the other one of side members 44 and 46, then extend back toward front edge 54, then toward the other one of side members 44 and 46 again for another short distance, as best seen in FIG. 5. As a result, framework 42 is open from the back, and an indentation similar to the indentations centrally located on side members 44, 46 exists at the back of framework 42. This indentation is dimensioned to accommodate a solid back panel 64, which attaches to left and right side members 44, 46 to cover the opening in the back of framework 42. Back panel 64 serves the same functions as side panels 58, 60, discussed above. Hence, back panel 64 helps in fully enclosing cabinet 40 and may be finished to accommodate a particular decor.

A solid door 66 attaches to side members 44, 46 to provide easy access to the front interior of cabinet 40 while otherwise keeping the interior of cabinet 40 enclosed. Appropriate hinges, latches, handles, and locks may be associated with door 66 and side members 44, 46 to allow door 66 to operate in a conventional manner.

Door 66, back panel 64, side panels 58, 60, top 48, and bottom 50 cooperate to fully enclose the interior of cabinet 40. Since cabinet 40 is fully enclosed, danger from electrical power routed therethrough is minimized, and security to prevent or minimize unwanted meddling may be provided. While FIGS. 3-5 do not show openings in back panel 64, side panels 58, 60, top 48, or bottom 50, those skilled in the art will understand that appropriate access ports may be made where needed to allow wiring to enter and exit cabinet 40.

With respect to the interior of cabinet 40, elongated communication and power raceways 68 and 70, respectively, extend vertically within cabinet 40. FIGS. 3-5 depict communication raceway 68 as abutting and attaching to the interior of left side member 44 and power raceway 70 as abutting and attaching to the interior of right side member 46. However, this order may be reversed to best meet application demands. In the preferred embodiment, each of raceways 68, 70 is approximately 1.75 inches wide (from right to left), 4 inches deep (from front to back) and 52 inches long. As best shown in FIG. 4, raceways 68, 70 do not need to extend entirely to the top or bottom of framework 42.

Communication raceway 68 is an open frame in the preferred embodiment of the present invention. In other words, raceway 68 is preferably a skeleton which includes a significant amount of open space through its sides. However, the sides of raceway 68 have sufficient solid material to provide strength and form. The front of raceway 68 is open and unobstructed throughout its entire length. Raceway 68 provides a channel through which communication cables for both individual and collective connectivity may be vertically routed within cabinet 40. The open nature of raceway 68 promotes ease in working the cables through raceway 68 during installation, and provides numerous options for allowing cabling to enter, exit, and cross raceway 68.

Power raceway 70 is a substantially enclosed tube. Raceway 70 is enclosed for safety reasons and to comply with building codes with respect to the transmission of electrical power. Thus, raceway 70 includes a channel 72 having generally solid side and back walls. However, an interior side wall 74 of channel 72 includes an opening 76 located near its bottom side over which a power expansion plate 78 fits. In the preferred embodiment, up to twelve connectors (not shown) mount in plate 78 to convey individual power connectivity out from raceway 70 to power whips 32 (see FIG. 2).

The front side of channel 72 of raceway 70 is open throughout its entire length. This opening allows electrical power cables to be worked within channel 72. A solid access cover 80 removably attaches to channel 72 to cover this opening. A top cap 82 and a bottom cap 84 attach to the top and bottom of channel 72 to cover top and bottom openings.

Power raceway 70 routes electrical power cables vertically within cabinet 40. While raceway 70 is substantially enclosed, this cabling must enter and exit raceway 70. Power expansion panel 78 serves as one exit point for such cabling. Additional exit points are provided by knockouts 86 located in top and bottom caps 82, 84 and in interior side 74 of channel 72.

A back frame 88 extends the full distance between raceways 68 and 70 within cabinet 40 and is positioned at the back side of the interior of cabinet 40. In the preferred embodiment, frame 88 extends vertically for a distance of approximately 40 inches. As best shown in FIG. 4, the top side of frame 88 may extend above the top of raceways 68, 70. Frame 88 extends forward from the back of cabinet 40 for approximately 1 inch. At the forward most surface of frame 88, ears 90 extend left and right toward the interior of cabinet 40 for a short distance. Ears 90 include appropriately spaced and tapped holes 92 which are used in mounting breakout panels, discussed below. Accordingly, at least 3 inches remains in front of back frame 88 within the interior of cabinet 40.

A front frame 94 attaches to the lower section of back frame 88 in the preferred embodiment of the present invention. Front frame 94 is approximately the same width (left-to-right) as back frame 88, approximately 3 inches deep (front-to-back), and approximately 27 inches long (top-to-bottom). Front frame 94 includes back ears 96, which are used in attaching front frame 94 to back frame 88. Front frame 94 also includes front ears 98, which are used in attaching circuit breaker panels, as discussed below. When mounted within cabinet 40, the bottom of front frame 94 remains above the top of power expansion panel 78. Only a very small amount of space remains in front of front frame 94 within the interior of cabinet 40, but approximately the entire width and depth of the interior of cabinet 40 is vacant in the vicinity of power expansion panel 78.

Cabinet 40 is specifically configured for efficiently transforming individual connectivity into collective connectivity. This transformation requires the use of breakout panels, circuit breaker panels, and the like, in combination with the routing of a substantial number of cables through cabinet 40. In addition, MCEC 14, which includes cabinet 40, various breakout panels, and cables, transforms connectivity for all commodities required at workstations 12 (see FIGS. 1-2).

FIG. 6 shows a front view of MCEC 14. Communication cables have been omitted for clarity. Circuit breaker panels 100 and 102 attach to front frame 94 (see FIGS. 3-5) of MCEC 14. Panels 100, 102 preferably receive 60 amp, 5-wire electrical power feeder services 104, 106, respectively, which include three hot wires, a neutral wire, and an earth ground wire (not specifically shown). Services 104-106 provide collective connectivity because each feeder service supplies the needs of several workstations 12. Typically, such services are supplied using 6 ga. wires. Preferably, service 104 provides clean or conditioned electrical power while service 106 provides normal power. Normal power is typically used for supplying non-computer related equipment, and clean power is typically used for computer-related equipment.

Services 104, 106 are routed into and through power raceway 70 until they are adjacent to their respective circuit breaker panel 100, 102. They are then routed through the appropriate knock-out 86 (see FIGS. 3-4) into the respective panel 100 or 102.

Circuit breaker panels 100, 102 are substantially identical to one another. Each of panels 100, 102 expands the three circuits of electrical power fed by services 104 or 106 into twelve independent circuits. In other words, four circuit breakers are installed on each of the three feeder circuits. The four circuit breakers isolate the four independent expanded circuits created thereby from one another. Each of workstations 12 associated with MCEC 14 may receive its own independent power circuit which is isolated from the corresponding power circuits of the other workstations 12 by the circuit breakers.

After expanding power in panels 100, 102, wires are routed back to power raceway 70 and through raceway 70 to power expansion panel 78. At expansion panel 78, these wires are re-grouped for individual connectivity, and terminated at connectors 108, each of which preferably has eight conductors. Connectors 108 each face the interior of MCEC 14, toward communication raceway 68. Each of connectors 108 provides individual connectivity because the power conveyed thereby supplies the needs of a single workstation 12.

Figure 7:
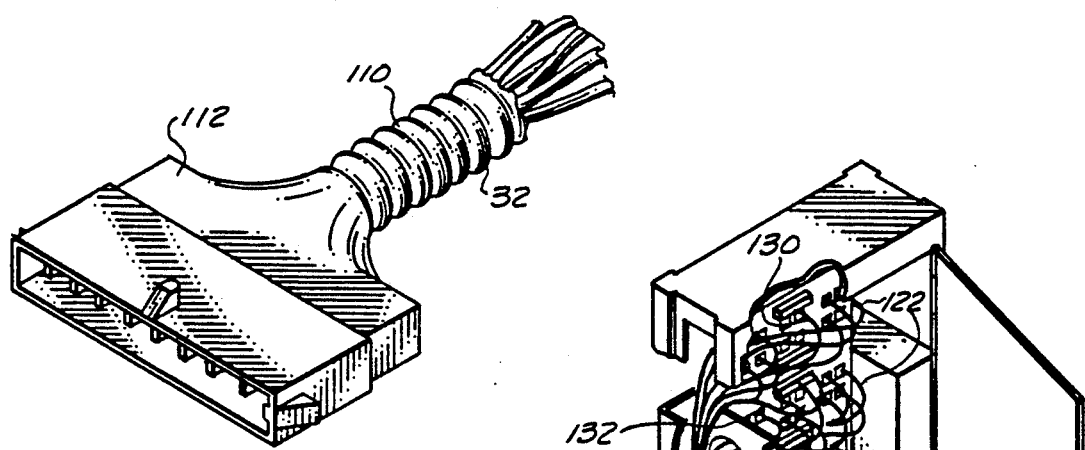
FIG. 7 shows an end of a preferred power whip utilized by the preferred embodiment of the present invention.

FIG. 7 shows an end of power whip 32. As mentioned above, power whip 32 conveys electrical power wiring within a flexible conduit 110. Power whip 32 is connectorized to terminate such wiring at a connector 112, which has eight pins and mates with connector 108 (see FIG. 6).

The power wiring from circuit breaker panels 100, 102 (see FIG. 6) is conveyed through the eight pin connectors to provide up to 4 separate power circuits. An example of a pin configuration that supports 4 separate power circuits is presented in TABLE II, below.

TABLE II

| Exemplary Four-Circuit Independent Power Connectivity | |
|---|---|
| Pin No. | Pin Function |
| 1 | Equipment Ground |
| 2 | Neutral for Normal Power (Circuits 1-3) |
| 3 | Neutral for Clean Power (Circuit 4) |
| 4 | Isolated Ground |
| 5 | Hot wire for Circuit 4 |
| 6 | Hot wire for Circuit 1 |
| 7 | Hot wire for Circuit 2 |
| 8 | Hot wire for Circuit 3 |

With reference to FIG. 6 and TABLE II, the configuration depicted in TABLE II takes three circuits from circuit breaker panel 102 and one circuit from circuit breaker panel 100. Of course, those skilled in the art may devise other configurations for using eight conductors to convey other numbers of independent circuits to individual workstations 12.

While conduit 110 (see FIG. 7) is flexible, it cannot be bent in as small a radius as cables alone can be bent. Thus, the space provided by cabinet 40 below circuit breakers 100, 102, along with the orientation of connectors 108, allows sufficient running room for power whips 32 so that they can be conveniently routed out of MCEC 14.

The preferred embodiment shown in FIG. 6 depicts four communication collection/expansion panels attached to back frame 88 and/or front frame 94 (see FIGS. 3-5). A panel 114 provides a multiplexer/demultiplexer for transforming individual electrical wire-based communications into collective fiber-optic communications. Fiber optic communications may be routed from a fiber optic network into panel 114 through communication raceway 68. Individual electrical communication wires may be routed out from panel 114 into communication raceway 68, and out of raceway 68 and MCEC 14 to individual workstations 12.

A LAN panel 116 attaches to back frame 88. In accordance with the particular application, individual LAN connectivity may be coupled together at panel 116 or grouped together into a cable bundle for conveyance to another location. Multiplexer and LAN panels 114 and 116, respectively, are optional panels which may be omitted when circumstances warrant.

Voice/data transformation panels 118 and 120 are substantially identical to each other. Each of panels 118 and 120 transform individual connectivity for the voice and data communication of six of workstations 12 (see FIGS. 1-2) into collective connectivity.

Figure 8:
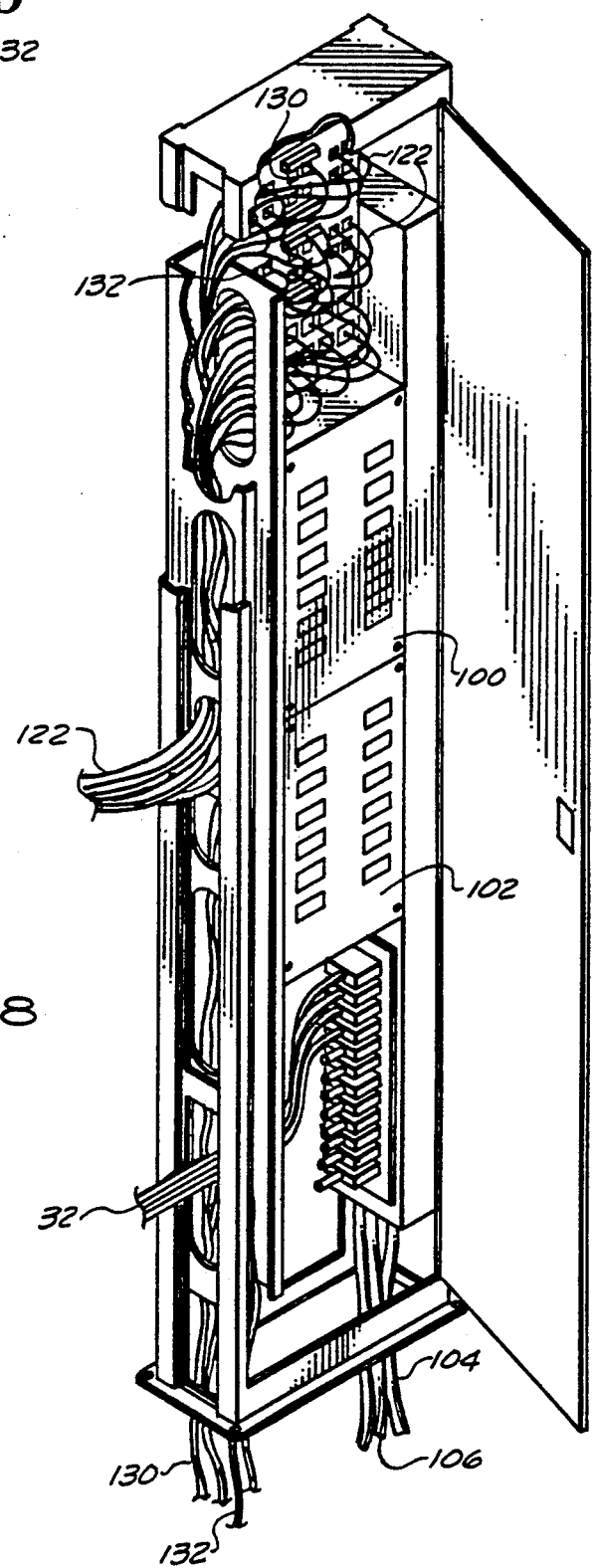
FIG. 8 shows a perspective view of a preferred MCEC with various break-out panels installed therein.

Panels 118 and 120 are best appreciated by simultaneously referring to FIGS. 6 and 8. In the preferred embodiment, voice communication and low speed data communication each rely on twisted pairs of wires. Each workstation receives four of such twisted pairs for voice communication and four of such twisted pairs for data communication. Each group of four twisted pairs is conveyed to its associated workstation by a single cable 122 that includes the four pairs. Preferred examples of such cable are discussed in detail in the above-listed related patent. Cables 122 enter MCEC 14 from a spine wall 18 (see FIG. 2), or other fixture, from workstations 12. Cables 122 are routed into communication raceway 68 and vertically up raceway 68 until they are in the vicinity of panels 118, 120. Cables 122 then exit raceway 68 for connection to panels 118, 120. Cables 122 are connectorized for mating with connectors 124 located on panels 118, 120. Preferably connectors 124 resemble the 8 pin connectors discussed in the above-listed related patent.

Panels 118, 120 receive all conductors from the individual connectors 124. A printed circuit board (not specifically shown) routes these conductors from the individual connectors to corresponding collective connectors 126 and 128. Connector 126 conveys all voice communications received at a panel 118, 120, and connector 128 conveys all data communications received at a panel 118, 120. Accordingly, for each of panels 118-120, individual communication connectivity for six of workstations 12 is transformed into collective communication connectivity.

In particular, 24 independent voice pairs and 24 independent data pairs are received at six of voice connectors 124 and at six of data connectors 124, respectively. Connectors 124 mount on a printed circuit board and face forward so that sufficient cable running room exists in front of panels 118, 120 for cables to be routed out of communication raceway 68 into appropriate ones of connectors 124. The printed circuit board includes conductive traces which convey the 24 voice pairs to collective connector 126 and convey the 24 data pairs to collective connector 128. Connectors 126 and 128 are preferably 50 pin connectors, each of which can accommodate 24 pairs of conductors.

A single collective communication cable 130 having 25 twisted pairs of wires and a single collective communication cable 132 having 25 twisted pairs of wires are connectorized for mating with connectors 126 and 128, respectively. The open space in front of panels 118, 120 permits sufficient running room for collective cables 130, 132 to bend and enter communication raceway 68. Cables 130, 132 then exit MCEC 14 and are routed to a communication distribution center 26 (see FIG. 1).

In summary, the present invention provides an improved system for achieving integrated connectivity with a multiplicity of workstations. A multi-commodity expansion cabinet (MCEC) transforms individual cabling into collective cabling. The MCEC encloses the devices and cabling that perform this transformation. Thus, safety, security, and aesthetic advantages of enclosed equipment racks are achieved. At the same time, the MCEC includes separate power and communication raceways on opposing sides of equipment bays. The raceways permit the MCEC to enjoy the ease of access advantages typically achieved by open equipment racks.

A depth dimension of the MCEC is maintained at around five inches. This five inch dimension is particularly desirable in adapting to spine walls and in preventing the MCEC from imposing a serious burden on human traffic ways within a building. The MCEC of the present invention permits improved isolation of electrical power conveyed to individual workstations in an environment having many workstations. Each workstation supported by an MCEC may have its own circuit breaker. Thus, if a malfunction causes one workstation's circuit breaker to trip, other workstations remain on line. Collective connectivity may be utilized between building services and the MCEC. Consequently, material, installation, and revision costs of workstation connectivity are reduced.

The present invention has been described above with reference to a preferred embodiment. However, those skilled in the art will recognize that changes and modifications may be made in this preferred embodiment without departing from the scope of the present invention. For example, the terms front, back, top, bottom, left, and right are used herein as relative terms to simplify the detailed descriptions of the preferred embodiment. Those skilled in the art will understand that MCEC 14 may be utilized in any orientation. In addition, the relative positions of various panels within MCEC 14 may be switched around. These and other changes and modifications which are obvious to those skilled in the art are intended to be included within the scope of the present invention.

What is claimed is:

1. A multi-commodity connectivity expansion cabinet comprising:
   an elongated communication raceway;
   an elongated power raceway extending substantially parallel to and spaced apart from said communication raceway;

a first frame extending between said communication and power raceways to define a communication break-out bay;

a second frame extending between said communication and power raceways to define a power break-out bay;

at least one communication breakout panel residing within said communication break-out bay, said communication panel having a multiplicity of individual communication cable connectors each having a first number of conductors for routing communication connectivity to individual workstations and at least one collective communication cable connector having a second number of conductors, (said second number being greater than said first number), for routing collective communication for a plurality of said individual workstations to a communication distribution center; and at least one circuit breaker panel residing within said power break-out bay.

2. A connectivity expansion cabinet as claimed in claim 1 wherein:

said communication break-out panel has a back side facing said first frame and a front side opposing said back side;

said connectivity expansion cabinet additionally comprises a cable accommodation means to accommodate a plurality of individual communication cables and at least one collective communication cable, said cable accommodation means allowing said individual and collective cables to be routed through at least a portion of said communication raceway and exiting said communication raceway in front of said communication panel; and said communication breakout panel is configured so that said individual cable connectors are positioned to cause said individual communication cables to engage said communication panel at said front side thereof, and said collective cable connectors are positioned to cause said collective communication cable to engage said communication panel from said front side thereof.

3. A connectivity expansion cabinet as claimed in claim 2 wherein said communication breakout panel comprises a substantially planar printed circuit board having said individual and collective connectors mounted thereon and having conductive traces extending between each of said individual connectors and said collective connector.

4. A connectivity expansion cabinet as claimed in claim 1 wherein said circuit breaker panel is configured to receive a five-wire feeder line and to expand said five-wire feeder into twelve individual power circuits, said twelve individual power circuits being isolated from one another.

5. A connectivity expansion cabinet as claimed in claim 1 additionally comprising a second circuit breaker panel residing within said power break-out bay, said circuit breaker panel being configured to receive a first five-wire feeder line, and said second circuit breaker panel being configured to receive a second five-wire feeder.

6. A connectivity expansion cabinet as claimed in claim 5 additionally comprising:

a plurality of individual power connectors, each of said individual power connectors having a first set of connector pins coupled to said circuit breaker panel and a second set of connector pins coupled to said second circuit breaker panel; and a plurality of individual power cable whips, coupled to corresponding ones of said individual power connectors, each power cable whip being for routing at least two independent circuits of electrical power to an individual workstation.

7. A connectivity expansion cabinet as claimed in claim 6 wherein said power cable whips and said individual power connectors are configured to convey four independent circuits of electrical power to an individual workstation.

8. A connectivity expansion cabinet as claimed in claim 6 wherein said individual power connectors attach to said power raceway so that said power connectors face said communication raceway.

9. A connectivity expansion cabinet as claimed in claim 1 additionally comprising:

a plurality of individual power connectors attached to said power raceway; and a plurality of individual power cable whips, coupled to corresponding ones of said individual power connectors, each power cable whip being for routing electrical power to an individual workstation.

10. A multi-commodity connectivity expansion cabinet system comprising:

an elongated communication raceway having a front side and a back side;

an elongated power raceway having a front side and a back side and extending substantially parallel to and spaced apart from said communication raceway;

a first frame extending between said communication and power raceways proximate said back sides thereof to define a communication break-out bay, said first frame extending toward said front sides for a first distance;

a second frame extending between said communication and power raceways to define a power break-out bay, said second frame extending a second distance from said back sides, said second distance being greater than said first distance;

a plurality of individual communication cables, each having a predetermined number of wires therein, and at least one collective communication cable having at least one wire for each wire of each individual communication cable, said individual and collective cables being routed through at least a portion of said communication raceway;

a communication breakout panel having a front side facing the front sides of said raceways and residing within said communication break-out bay, said communication panel having a multiplicity of individual communication cable connectors positioned to cause said individual communication cables to engage said communication panel at said front side thereof, and having at least one collective communication cable connector positioned to cause said collective communication cable to engage said communication panel from said front side thereof;

a first circuit breaker panel residing within said power break-out bay.

11. A connectivity expansion cabinet system as claimed in claim 10 additionally comprising:

a second circuit breaker panel residing within said power break-out bay, said first circuit breaker panel being configured to receive a first five-wire feeder service, and said second circuit breaker panel being configured to receive a second five-wire feeder service;

a plurality of individual power connectors, each of said individual power connectors having a first set of connector pins coupled to said first circuit breaker panel and a second set of connector pins coupled to said second circuit breaker panel; and a plurality of individual power cable whips, coupled to corresponding ones of said individual power connectors, each power cable whip being for routing at least two independent circuits of electrical power to an individual workstation.

12. A connectivity expansion cabinet system as claimed in claim 11 wherein said individual power connectors attach to said power raceway so that said power connectors face said communication raceway.

* * * * *